J. C. HEBDEN & F. H. DANIELL.
M. B. DANIELL, EXECUTRIX OF F. H. DANIELL, DEC'D.
DYEING APPARATUS.
APPLICATION FILED JULY 28, 1909.

1,052,817.

Patented Feb. 11, 1913.

WITNESSES

INVENTORS

J. C. HEBDEN & F. H. DANIELL.
M. B. DANIELL, EXECUTRIX OF F. H. DANIELL, DEC'D.
DYEING APPARATUS.
APPLICATION FILED JULY 28, 1909.

1,052,817.

Patented Feb. 11, 1913.

UNITED STATES PATENT OFFICE.

JOHN C. HEBDEN, OF PROVIDENCE, RHODE ISLAND, AND FREDERICK H. DANIELL, OF FRANKLIN, NEW HAMPSHIRE; MARY B. DANIELL EXECUTRIX OF SAID FREDERICK H. DANIELL, DECEASED.

DYEING APPARATUS.

1,052,817.  Specification of Letters Patent.  Patented Feb. 11, 1913.

Application filed July 28, 1909. Serial No. 510,073.

*To all whom it may concern:*

Be it known that we, JOHN C. HEBDEN and FREDERICK H. DANIELL, citizens of the United States, residing at Providence, in the county of Providence and State of Rhode Island, and Franklin, in the county of Merrimack and State of New Hampshire, respectively, have invented certain new and useful Improvements in Dyeing Apparatus, of which the following is a specification.

Our invention is a dyeing apparatus for use in treating textiles with liquor or gas in dyeing, mordanting, bleaching, scouring, washing, drying or other similar processes. Our invention relates particularly to a machine for treating yarn and other fibrous material wound into cops or bundles and consists of improvements in the method of handling the material during the processes of treatment; in the means for confining the yarn under pressure to secure a uniform density of all parts of the mass without disturbing the conformation of the packages or the relation of the coils of winding; and for regulating and controlling the flow of the fluid to subject the material to a thorough permeation.

Our invention is fully set forth in the following specification, illustrated by the accompanying drawings, in which:—

Figure 1:
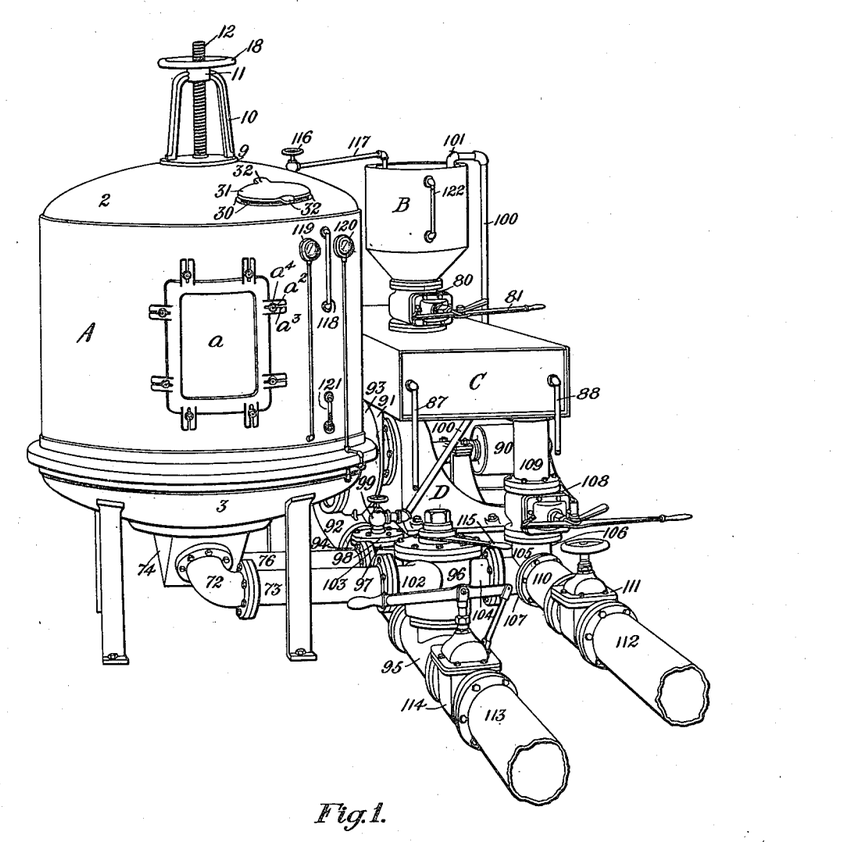
Figure 1 is a perspective view of the complete apparatus.

The apparatus in general consists of the following basic elements, as shown in Fig. 1: A is the keir in which the material is contained during the dyeing or other process; B is a supply or mixing tank which receives the dyeing liquor or other fluid; C is a heating chamber in which the fluid is given the proper temperature; and D is a centrifugal pump which causes a circulation of the fluid from the heating chamber into the keir and back again, through the arrangement of pipes and valves hereinafter explained.

Figure 2:
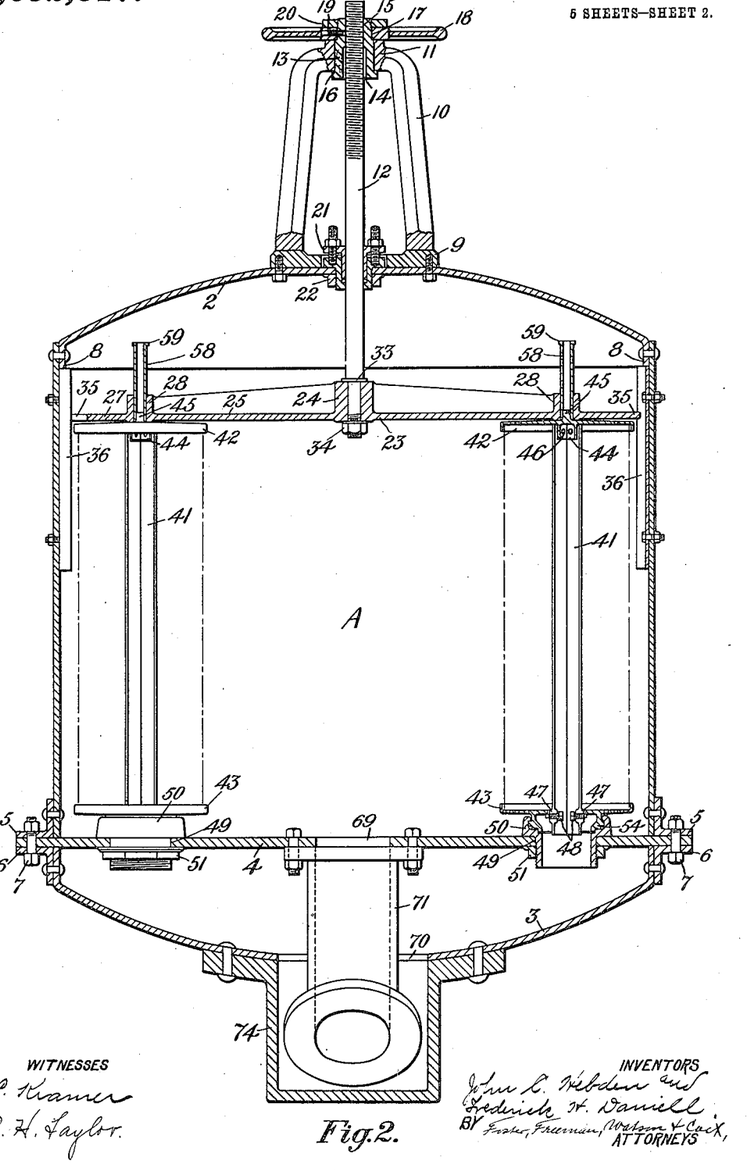
Fig. 2, a vertical, transverse, sectional view of the keir or dyeing chamber.

As shown in Fig. 2, the keir A is preferably of cylindrical form with a dome-shaped top 2 and a similarly shaped convex bottom 3. Between the cylindrical portion and the convex bottom 3 is a diaphragm or false-bottom consisting of a plate 4 fastened to the angle-iron rings or flanges 5 and 6 which extend around the outside of the keir and are riveted thereto. Bolts 7, 7, etc., extend through the flanges 5 and 6 and the rim of the plate 4 to secure the latter in position. The dome or top 2 is formed with a flange 8 fitted to the inside of the cylindrical portion of the keir and riveted thereto, and all of these joints are filled with gaskets or other suitable packing to prevent leakage.

On the front of the keir A is a door $a$, shown in Fig. 1, adapted to close an opening through which the material to be dyed is passed into the keir. The door $a$ is secured in place by bolts $a^2$ passing through slots in the lugs $a^3$ and adapted to receive nuts $a^4$ which bind on the lugs and force the door snugly against its seat. Suitable packing or gaskets are provided to make the door tight where it fits its seat.

Secured to the top of the dome 2 is a ring plate 9 to which is attached a yoke 10 with a bearing at 11 for the plunger spindle 12. In the bearing 11 is a sleeve 13 counter-bored at 14 and threaded internally at 15 to engage the thread of the spindle 12. The sleeve 13 is formed with a shoulder 16 abutting the bottom face of the bearing 11, and turned down at 17 to enter the bore of the hub of a hand-wheel 18. The hand-wheel 18 is preferably secured to the sleeve 13 by a pin 19 and the nut 20 screwed on to the threaded end of the sleeve. A usual form of stuffing-box 21 is secured in a central bore in the dome 2 by means of the nut 22 screwed on to its threaded end and abutting the inside of the dome. The spindle 12 extends downward through the stuffing-box 21 and carries at its lower end the compression head 23, shown in plan view in Fig. 5. Preferably the threads on the upper end of the spindle 12 are left-handed so that when the wheel 18 is turned to the right the spindle will be slid downward through its stuffing-box to carry the compression head downward in the keir.

Figure 5:
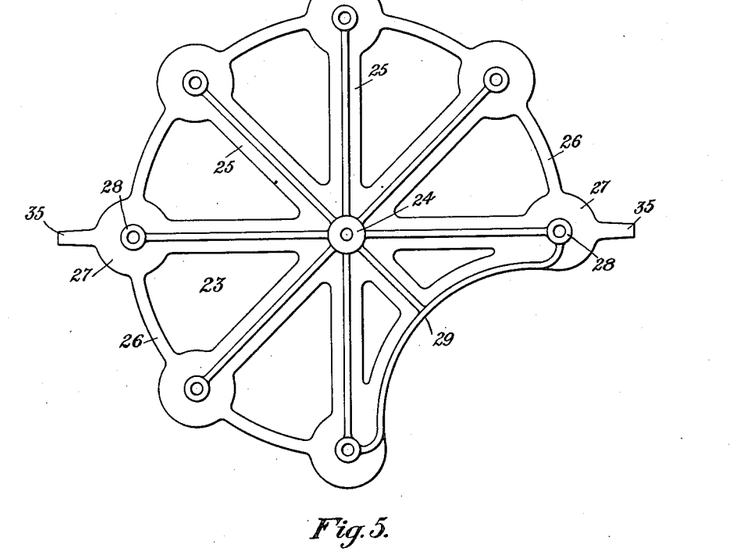
Fig. 5, a plan view of the sliding compression head.
Figure 6:
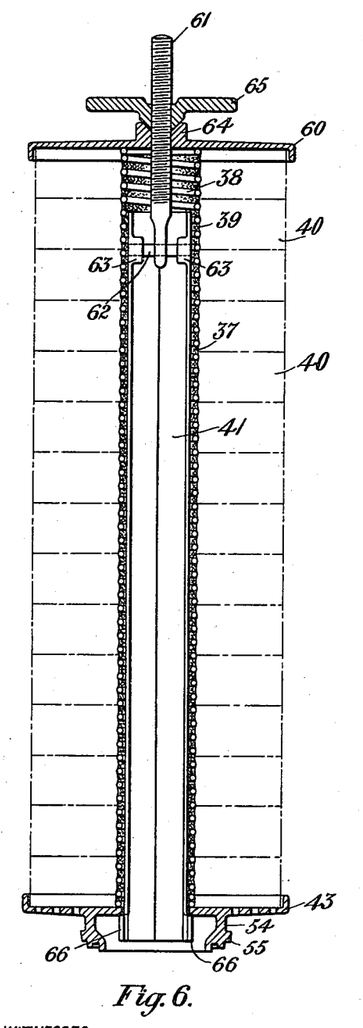
Fig. 6, a sectional view of one of the units on which the material is supported.

Referring to Fig. 5, the head 23 consists of a circular, wheel-like frame having a central hub 24 and ribbed spokes or arms 25—25, etc., radiating therefrom to the rim 26. The rim 26 is formed with bosses 27—27, etc., having hubs 28—28, etc., bored to receive the studs extending from the units which support the packages of material being treated. The keir is shown as arranged to accommodate eight units supported vertically between the false-bottom 4 and the head 23, but it is preferable to arrange one of the units to be free from the head 23 so that test samples of the material may be removed from the keir through a hand-hole in the top to examine the same during the dyeing or other process. To provide for this, this unit is constructed with separate compression means of its own, as shown in Fig. 6 and hereinafter more fully described, and is supported in the keir independent of the head 23. The head 23 has only seven hubs around the rim 26 and these are spaced one eighth of the circumference apart with the eighth hub eliminated and the rim bowed in at 29 to provide space for gaining access to the free unit. A hand-hole 30 is provided in the dome 2, see Fig. 1, which has a cover 31 adapted to be screwed down into its seat by means of the hand lugs 32—32. The hand-hole 30 is located on the quarter on the dome 2 to correspond with the position of the bowed-in portion 29 of the rim 26, so that test samples may be removed from the free unit and taken out through the hand-hole without interference with the head 23. The head 23 is secured to the end of the spindle 12 by its hub 24 which is held against a shoulder 33 by a nut 34 screwed on to the end of the spindle. To prevent the head 23 from turning in the keir under influence of the turning movement of the hand-wheel, two diametrically opposed guiding lugs 35—35 are provided on the opposite bosses 27—27, adapted to slide in grooves in the guiding pieces 36—36 which are formed of channel iron and bolted to the inside of the keir, see Fig. 2.

The units for supporting the packages of yarn to be dyed or otherwise treated are similar in general arrangement to those shown in the patent of John C. Hebden and Frederick H. Daniell, No. 996,761, dated July 4, 1911. Specifically, they are constructed as follows and embody certain improvements as shown in Figs. 2 and 6 and now described: The yarn or other material is wound on porous tubes which are capable of longitudinal contraction, such forms of tubes being shown in the patent of Frederick H. Daniell, No. 974,126 dated November 1, 1910, and the patent of Frederick H. Daniell and John C. Hebden, No. 974,127, dated November 1, 1910. Any of the forms of tubes shown and described in these applications might be made use of, but we have preferred to here illustrate the one first disclosed, which consists of a helically coiled wire serving as a support for a tubular fabric sleeve and constituting a porous, non-collapsible tube capable of axial contraction under compression. In Fig. 6, such a form of tube 37 is shown in section with the helically coiled wire 38 serving as a tubular, ribbed framework for distending and supporting the fabric covering 39. The dot-and-dash lines indicate the yarn mass surrounding the tube, and as here illustrated the mass is shown as consisting of a plurality of cops or cheeses 40—40, etc., wound with separate yarns on one continuous tube with the ends of the packages abutting each other. This is the preferred method of winding the packages for dyeing warps having a plurality of ends, but it is obvious that a single end might be wound on the tube with a traverse extending from end to end of the latter; or a number of packages of lesser traverse might be wound on shorter tubes and stacked end for end as specified in our patent, No. 996,761, previously referred to.

Figure 10:
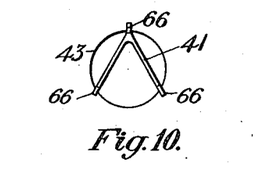

In whatever form it is preferred to wind the packages the means for supporting the units between the diaphragm 4 and the head 23 will be the same. This consists of a stringer 41 which is preferably formed of angle-iron, see Figs. 2, 6 and 10, to provide for a three point bearing within the tube 37 without obstructing the latter to prevent the flow of the liquor through the tube. As shown in Fig. 2, the stringers 41—41 have rimmed flanges 42 and 43 at each end adapted to press upon the ends of the packages to effect the compression of the yarn mass. The stringers for the units which are held at the top by the head 23 are arranged as follows: The upper flanges 42—42 are secured to the ends of the stringers 41—41 by means of the central triangular-shaped lugs 44, see Fig. 2, adapted to fit the inside of the angle-iron and fastened thereto by the rivets 46—46, or by other suitable means. The lower ends of the stringers project through central openings in the flanges 43—43 and are formed with bosses 47—47 through which the set screws 48—48 are screwed. The packages of material are strung on to the stringers 41 against the fixed flange 42, and the removable flange 43 is then applied to the opposite end of the stringer. The packages are compressed sufficiently to allow the flange 43 to pass beyond the screws 48—48 and these latter are then adjusted to hold the flange in position on the stringer, as shown in Fig. 2.

Figure 7:
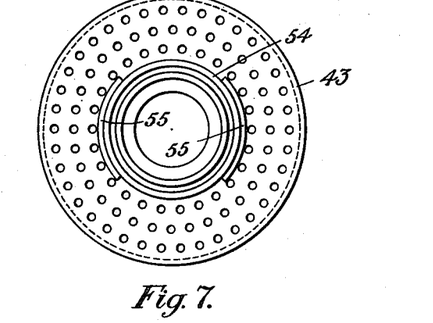
Figs. 7, 8, 9 and 10, views showing details of construction.
Figure 8:
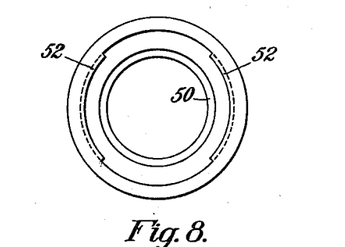
Figure 9:
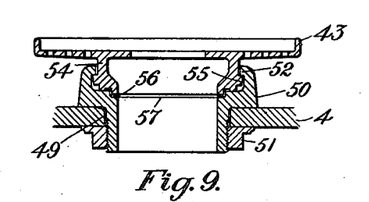

The flanges 43 are removably secured in openings in the diaphragm 4 in the following manner: The diaphragm plate 4 is provided with eight openings 49—49, etc., arranged in a circle with their centers in line with the centers of the hubs 28—28, etc., on the compression head 23. Adapted to these openings are socket members 50—50 formed with shouldered sleeves extending through the plate 4 and secured in position by the nuts 51—51 screwed on to their threaded ends. The sockets in the upper part of the members 50 are formed with interrupted threads 52—52, see Fig. 8, and a sleeve 54 on the lower side of the flange 43 is adapted to enter the socket and is formed with corresponding threads 55—55, see Fig. 7, to engage those of the member 50. The arrangement is similar to the breech-block mechanism used in ordnance construction and adapts the two parts to be locked firmly together by bringing their threaded portions into proper alinement and giving the flange 43 a quarter turn to engage its threads with the threads of the socket 50. A washer 56 of lead or other suitable material is interposed between the end of the sleeve 54 on the flange 43 and a shouldered seat 57 in the socket 50 to make the joint tight.

The upper flanges 42 are provided with central studs or projections 45—45, and when the lower flanges are in position in their sockets these studs will aline with the openings in the hubs 28 of the head 23. For convenience in adjusting the head 23 down into proper engagement with the flanges 42 we make use of slip bushings 58—58 arranged to slide in the hubs 28 and bored to receive the studs 45. The bushings 58 are made considerably longer than the hubs 28 and when the head 23 is raised from the flanges 42 they will slide down through the hubs, being prevented from dropping out by the projecting rims 59—59 formed on their upper ends. The head 23 is raised to allow the placing of the units with their flanges 43 in the sockets 50 and the bushings 58 will then extend down through the hubs 28 and can be fitted over the studs 45. When the head is lowered the bushings will guide the studs into proper engagement with the openings in the hubs to centralize the units in their bearings.

In Fig. 6 is shown the free unit from which test samples may be removed from the keir through the hand-hole 30. The lower flange 43 is substantially the same in construction as the lower flanges for the other units, but the upper flange 60 in this case, instead of being secured to the end of the stringer 41, is removable from the stringer and adapted to be adjusted in the direction of the length of the latter. In this arrangement the angle-iron portion of the stringer is shorter than that of the other stringers and is provided at its upper end with an extension consisting of an eye-bolt 61 connected to the angle-iron by a transverse pin 62 driven through bosses 63—63. The bolt 61 projects through a central hole in the hub 64 on the flange 60 and is threaded to receive a hand-nut 65. Preferably the hub of the hand-nut is formed with a conical bearing fitted to a similarly shaped counterbore in the hub 64. The lower end of the stringer 41 is here shown as formed with lugs 66—66, see Fig. 10, which take the place of the set screws shown in connection with the other stringers and serve as permanent stops to abut the under side of the flange 43 and prevent the stringer from being drawn through the opening in the latter.

The diaphragm 4 divides the keir A into two compartments or chambers and the units are supported in the upper chamber between the false-bottom 4 and the compression head 23. By the arrangement of the lower supports for the units just described, the socket members 50 provide a direct communication from the lower chamber to the interior channels extending through the tubes on which the yarn is supported. The diaphragm 4 also has another orifice 69 arranged centrally and registering with the flanged end of an elbow pipe 71 which is bolted to the diaphragm. The elbow 71 extends through an enlarged opening 70 in the bottom 3 of the keir and is connected at its opposite end to the flanged quarter-bend pipe 72, see Fig. 1. The quarter-bend 72 is connected to the straight pipe-section 73 and it will be seen that these connections form a channel for the ingress or egress of the fluid to and from the upper chamber of the keir. The lower chamber also has an ingress or egress channel of pipe connections arranged as follows: Riveted to the bottom of the keir and registering with the opening 70 in the latter is a V-shaped trough-like casing 74, shown in Fig. 1. The front side of this casing 74 intervenes between the flanges of the elbow 71 and quarter-bend 72, being provided with an opening registering with the openings in the pipes, and the flanges are bolted to the casing and together with the same bolts. To the opposite flat side of the casing 74 is bolted the flange of a quarter-bend pipe 75, see Fig. 3, arranged the reverse of the quarter-bend 72, and connected at its opposite flanged end with the straight pipe-section 76 running parallel to the pipe 73. The casing 74 has an opening registering with the orifice in the connected end of this pipe 75 and these latter pipe connections lead into the casing 74 and thence to the lower chamber of the keir A.

Figure 4:
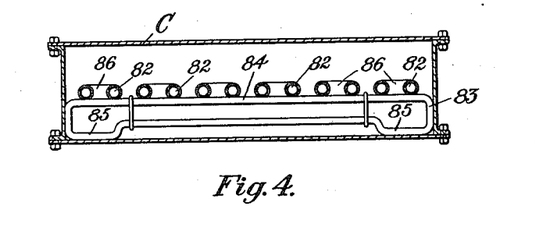
Fig. 4, a vertical, transverse, sectional view of the heating chamber.

The mixing tank B is mounted on top of the heating chamber C, see Fig. 1, and is preferably of cylindrical form with a funnel-shaped bottom leading into a quick-opening valve 80 of usual form, operated by the hand lever 81 to open into the chamber C. The heating chamber C consists simply of a rectangular box formed of plates bolted together, as shown in Fig. 4. In the center of the chamber is a coil of pipes 82—82, etc., supported horizontally on frames 83, two of the latter being used, and preferably made of rods bent up with the transverse supporting bar 84 and the feet 85—85. The pipes 82 are connected by U-bends 86—86 arranged alternately at either end in the usual manner. employed in the construction of steam coils to provide for a continuous circulation of the steam back and forth across the length of the chamber C, and the supply pipe 87 and exhaust pipe 88, see Fig. 1, are connected to the ends of the coil and lead to the source of the steam supply, not here shown. The fluid, either liquor or gas, has a free circulation around the steam coil and can be heated to the proper temperature in the chamber C before it is forced into the keir A.

Figure 3:
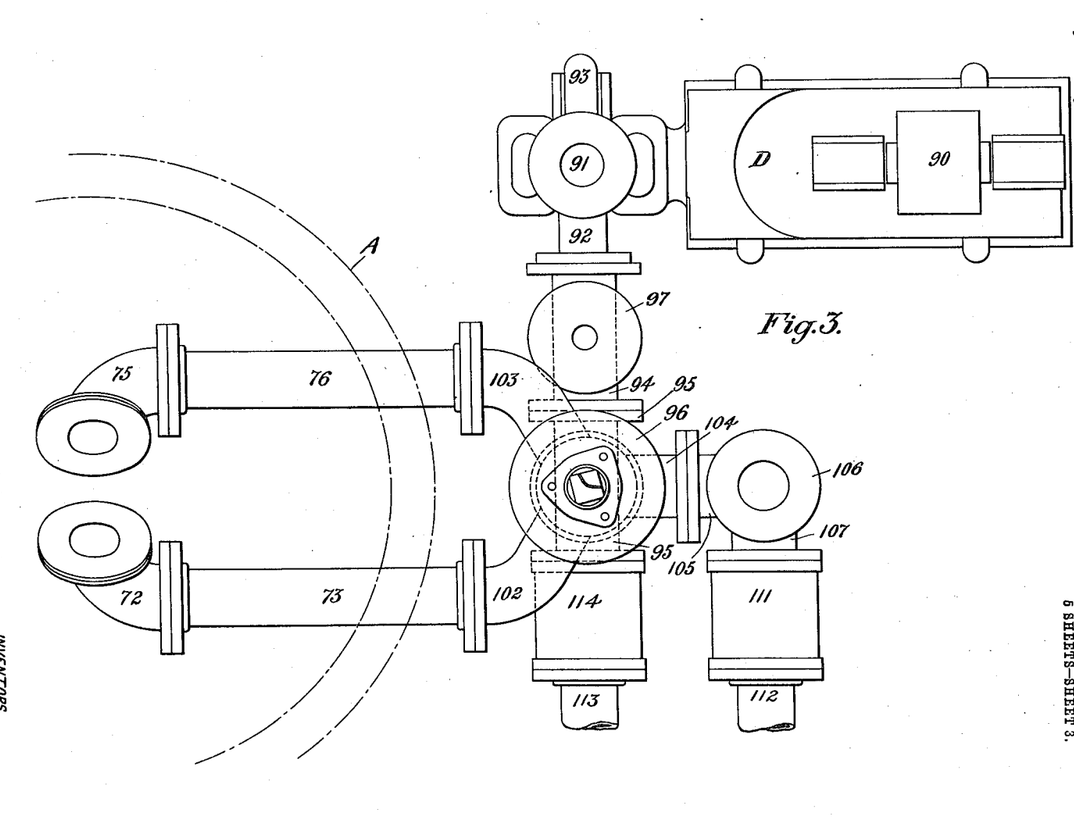
Fig. 3, a plan view of the pump and pipe connections which regulate the flow of fluid.

The fluid passes from the heating chamber C to the keir A through a system of pipes and valves now explained: The pump D may be of any well known construction, preferably of the horizontal type, as shown in Figs. 1 and 3, and is situated partly underneath the chamber C with its driving pulley 90 projecting out at one side and arranged to be belted to the source of power, either an electric motor or an engine driven countershaft, not here shown. With the type of pump here shown the suction pipe 91, see Fig. 3, has a flanged end which is connected to the under side of the chamber C and the discharge pipe 92 leads out from the under side of the casing 93 and is connected through a flanged pipe 94 to a T-pipe 95 leading up into a four-way valve 96. The pipe 94 is preferably a T arranged with its flanged branch 97 extending upward, and bolted to this flange is a plate 98 into which is screwed the small hand-valve 99. To the hand valve 99 is connected a small pipe 100 which leads up around the chamber C with its end 101 adapted to discharge into the mixing tank B. By opening the valve 99 a small quantity of the fluid is bled from its flow through the T-pipe 94 and discharges into the mixing tank B to create a stirring action and keep the liquor thoroughly mixed as hereafter more fully explained.

The four-way valve 96 is formed with two diverging branches 102 and 103 which are connected by their flanges to the flanged ends of the pipes 73 and 76 which, respectively, lead into the upper and lower chambers of the keir A. Leading from the opposite side of the valve 96 is a flanged branch 104 which is connected to a three-way elbow 105 having two branches 106 and 107. The branch 106 extends upward and is connected to a quick-opening valve 108, from which a union 109 leads into the mixing tank C, see Fig. 1. The other branch 107 is connected by a union 110 to a valve 111 which, in turn, is connected to a pipe 112. Parallel to the pipe 112 is a similar pipe 113 leading from a quick-opening valve 114 which is connected at its opposite end to the T-pipe 95 through which the fluid from the pump passes into the four-way valve 96. The two pipes 112 and 113 are used for discharge pipes as hereafter more particularly described.

The four-way valve 96 is operated by a lever 115, which is rotated about its axis to determine the direction of the flow of fluid through the valve. By turning this lever the flow through the inlet at the bottom of the valve may be caused to pass out through either of the branches 102 or 103 which lead to the upper and lower chambers of the keir, respectively, or, the valve may be set to discharge through the branch 104. As usual in valves of this well known form, the seat is so arranged as to provide for two separate directions of flow through the valve at the same time. For instance, when the valve is set to take the flow through the inlet at the bottom and discharge through the outlet 102, the branch 103 will be connected to the branch 104 and the former can be used as an inlet to discharge through the latter; or, vice versa, when the inlet at the bottom is connected to discharge through the branch 103 the branch 102 will be connected with the branch 104. In this way the pressure of the pump D can be arranged to cause a circulation of the fluid from the heating tank through the keir and back again into the tank in two different ways: either through the pipe 73, up into the upper chamber of the keir and back through the lower chamber, thence through the pipe 76, branch 103, into the valve 96 and out through branch 104; or, from the valve 96 through the pipe 76 to the lower chamber of the keir, then through the openings in the false-bottom 4 to the upper chamber, and exhausting down through the pipe 71 to the pipe 73, back through the branch 102 into the valve 96, and out through the branch 104.

Referring to Fig. 1, 116 is a small hand valve screwed into the top of the keir A and connected by a pipe 117 to discharge into the mixing tank B. This valve serves as a vent for the steam and gases given off by the boiling liquor in the keir and prevents back pressure in the latter. A water gage 118 is provided on the outside of the keir to show the level of the fluid and two pressure indicators 119 and 120 are arranged in convenient positions as shown. The indicator 119 has a pipe leading from the upper chamber of the keir and the pipe to the indicator 120 leads from the lower chamber so that the pressure in each chamber can be determined at a glance and regulated accordingly, as desired. A thermometer 121 is also provided to indicate the temperature of the fluid. The mixing tank B has a gage 122 to show the height of the fluid in this receptacle.

Having now particularly described the construction and arrangement of the parts of the whole apparatus the method of operation of the device will next be set forth.

The yarn or other material is first wound on to the longitudinally contractible holders or tubes 37, shown in Fig. 6, and in this form the cops or bundles are placed on the stringers 41, to be supported in units for subjection to the dyeing or other process. There are preferably seven fixed units arranged as shown in Fig. 2, with an eight free unit as shown in Fig. 6, which latter will hereafter be referred to as the test unit. The cops on the fixed units are held on the stringer 41 against the fixed flange 42 and the removable flange 43 is placed in position and pressure applied to force this flange toward the fixed flange. After the flange 43 is forced onto the stringer 41 beyond the screws 48 these are adjusted to hold the flange in place and the units are ready to be placed in the keir. The cops are placed on the test unit, shown in Fig. 6, with one end against the flange 43 and the flange 60 is then applied to the opposite end with the bolt 61 extending through the hub 64. The hand-nut 65 is next screwed down on the bolt against the flange and the latter will be forced toward the flange 43 which is held by the lugs 66—66. As the flange 60 is forced downward the cop support 37 will yield under pressure and contract longitudinally while the yarn mass is being compressed. Sufficient pressure is applied to the flange 60 to compress the yarn to a point where all portions of the mass are of the same density. After the yarn has been prepared in the manner above described the door a is opened and the units placed inside the latter. The head 23 is first raised by turning the hand-wheel 18 to the left and the lower flanges on the units are set into the sockets 50 and screwed into their seats. The slip bushings 58 are next engaged with the studs 45 on the flanges 42 and the head 23 is then lowered by means of the hand-wheel 18 to be brought down against the flanges. If it is desired to apply pressure to the yarn after the units are in position in the keir the hand-wheel 18 is turned to cause the head 23 to exert pressure on the flanges to give a further compression of the yarn on the fixed units and the stringers 41 will slide down through the openings in the lower flanges 43. The yarn on the free or test unit is compressed before placing the latter in the keir and in some cases it has been found more convenient to compress the yarn on the fixed units to the proper density before placing them in position. This may be accomplished by placing the units in a suitable press and arranging the adjusting screws 48 in such position on the stringers 41 that they will be properly placed to hold the lower flanges after the yarn is compressed to the maximum extent required. It will also be obvious that instead of using the stringers with fixed upper flanges, as shown in Fig. 2, the units might all be arranged similar to the test unit illustrated in Fig. 6 with a separate compression means on each stringer. In the latter case the hubs 28 on the head 23 would engage the ends of the bolts 61 and the head 23 would be used simply as a supporting means to locate and hold the upper ends of the units and steady them in their positions. The preferred arrangement, however, is to make use of the head 23 as a compression means for applying the pressure to a plurality of the flanges at one time, thereby providing for greater convenience and expedition in performing the operation. After the units are all in position in the keir, with the material held under compression as described, the door a is secured in position and the apparatus is ready for the dyeing or other process. The dye-liquor or other fluid is poured into the mixing tank B with the valve 80 open to allow it to flow down into the heating chamber C. Preferably, enough fluid is poured in to fill both the tank B and chamber C. The steam is turned on at its source of supply and enters the chamber C through the pipe 87, circulating through the steam coil within the chamber and exhausting through the pipe 88, which preferably leads to a condenser. After the fluid is properly heated the pump D is started and the fluid is sucked down from the chamber C through the intake pipe 91 and forced through the discharge pipe 92 and T-pipe 94 up into the four-way valve 96, the valve 114 being closed. The valve 96 is set to connect the inlet at its bottom, which leads from the T-pipe 95, with the rear branch 103 and the fluid will be forced through the pipe 76 into the lower chamber of the keir. The continued pressure of the pump causes the fluid in the lower chamber to be forced up through the orifices in the diaphragm 4, through the openings in the sockets 50 and flanges 43, and into the interior channels of the tubes which support the yarn. A column of fluid will be raised in the interior, axial channel of each unit and, the tubes which support the cops being porous, the liquor will be forced out through the walls of the tubes to radiate through the yarn and permeate the whole mass.

When the valve 96 is set as above described with the outflow leading through the branch 103 the front branch 102 will be connected with the opposite side branch 104 which leads into the three-way elbow 105. The valve 111 is kept closed and the valve 108 open, so that a continuous circulation of the fluid can be kept up, from the heating chamber into the lower chamber of the keir; through the yarn masses on the units into the upper chamber; then back again to the heating chamber.

By setting the valve 96 with the outflow leading through the front branch 102 instead of the branch 103 the circulation of the fluid through the keir can be reversed as follows: The pressure of the pump will then force the liquor through the pipe 73 into the upper chamber of the keir; through the material, permeating from the outside of the cops to the interior channels in the units; thence down through the openings in the diaphragm 4; and exhausting from the lower chamber out through the pipe 76, valve 96, and back into the heating chamber C. Either of these processes can be used, or both, if necessary, and the dye-liquor can be kept circulating back and forth through the yarn until a thorough saturation is effected and the proper shade of color secured. By removing the cover 31 test samples can be taken from the free unit through the handhole 30 and the yarn examined to determine the progress of the dyeing operation. While the circulation of the fluid is taking place the bleeding valve 99 is opened and a small stream of the liquor is forced up through the pipe 100 and flows into the mixing tank B. The tank B is preferably kept partly filled with the liquor and the valve 80 is open during the circulation, so that the flow from the pipe 100 will serve to stir the contents of the mixing tank and cause a gradual feeding of the liquor into the heating chamber. This keeps the liquor properly mixed and prevents any portion of the supply from becoming stagnant. The mixing tank B serves also as an expansion tank during the circulation of the liquor. The valve 80 is preferably kept open while the pump is running and the fluid is free to rise and fall within the tank B according to the flow from and to the heating chamber C so that the latter is kept always partly filled.

To empty the whole apparatus the valve 114 is opened and the fluid will drain down through the valve 96 and thence out through the pipe 113 which preferably leads to a waste tank or catch basin, not here shown.

The material may be washed in the keir if desired by pumping water through the apparatus in the same manner as the dye-liquor is pumped through and the water is led off through the discharge pipe 112 by closing or partly closing the valve 108 and opening the valve 111. Air or steam may be forced through the material for drying it in the same way.

It is obvious that various modifications might be made in the form and arrangement of the apparatus without departing from the scope of our invention.

Therefore, without limiting ourselves to the exact construction disclosed, what we claim is:

1. In an apparatus for treating textiles with fluids, the combination with a closed keir, of a diaphragm separating the keir into lower and upper chambers, a supply pipe leading into one chamber, an exhaust pipe leading from the other chamber, sockets 50 secured in the diaphragm and arranged with openings leading between the two chambers, flanges 43 fitted to the sockets, stringers 41 passing through the openings in the flanges, longitudinally contractible tubes on the stringers, flanges 42 secured on the stringers at the opposite ends from the flanges 43, and means to press the flanges 42 and 43 toward each other to contract the tubes and compress the yarn mass wound thereon.

2. In an apparatus for treating textiles with fluids, the combination with a cylindrical closed keir A, having a horizontal diaphragm 4 extending across its interior, of socket members 50 secured in openings in the diaphragm and formed with seats having interrupted threads, and flanges 43 having sleeves 54 formed with interrupted threads corresponding to those of the socket members and adapted to be screwed into the seats in the latter.

3. The combination with the closed keir A, of a sliding plunger spindle 12 and a compression head 23 attached to the spindle and formed with a central hub 24, with spokes 25 radiating from the hub and supporting a rim 26, said rim formed with hubs 28 and bowed in at 29 throughout a portion of its circumference to provide an open space in place of one of the hubs.

4. In an apparatus for treating textiles with fluids, the combination with a closed keir A, of means to support a plurality of cops in series on vertical units in the keir, flanges 42 having central studs 45 and arranged at the upper ends of the units, a head 23 slidable up and down on the inside of the keir and formed with hubs with bores alining with the studs 45, and slip bushings 58 adapted to slide in the bores of the hubs to drop down into engagement with the studs 45 when the head 23 is raised.

5. In an apparatus for treating textiles with fluids, the combination with a closed keir A, of a diaphragm 4 dividing the keir into upper and lower chambers and formed with openings 49, a plurality of dyeing units for supporting cops of yarn, comprising stringers 41, porous longitudinally compressible cop-tubes 37 supported on the stringers, flanges at the ends of the stringers, one flange adapted to slide on the stringer to allow it to be pressed toward the opposite flange, means to fixedly support the flanges at one end of the stringers in the openings in the diaphragm, and a compression head adapted to bear upon the opposite flanges to press them toward the fixed flanges to compress the cops in an axial direction.

6. The combination in an apparatus for treating textiles with fluids, with a closed keir A of a horizontal diaphragm 4 in the keir having a plurality of openings 49, socket members 50 in said openings, flanges 43 having sleeves fitted to the sockets and formed with central openings, stringers 41 extending through the openings in the flanges 43, flanges 42 at the opposite ends of the stringers, longitudinally contractible porous tubes on the stringers between the flanges, and compression means to force the flanges 42 and 43 toward each other to compress the yarn mass carried on the compressible tubes 37.

7. In a unit support for use in dyeing yarn wound in hollow cops, the combination with a stringer 41, of a flange 43 secured at one end of the stringer, a bolt 61 fastened to the opposite end of the stringer, a flange 60 bored to receive the bolt, and a hand-nut 65 adapted to be screwed down on the bolt to draw the two flanges together.

8. In a unit support for use in dyeing yarn wound in hollow cops, the combination with a stringer 41 formed of angle-iron and having lugs 66 at one end, a flange 43 having a central opening to receive the stringer and arranged with the edges of the opening abutting the lugs, a transverse pin 62 at the opposite end of the stringer, an eye bolt 61 secured by the pin to the stringer, a flange 60 bored to receive the bolt 61, and a hand-nut 65 fitted to the bolt.

9. In a unit support for use in dyeing textiles wound in hollow cops, the combination with a stringer 41, of a flange secured at one end of this stringer, a second flange adapted to slide on the stringer, a longitudinally, contractible porous tube arranged on the stringer between the two flanges, and means to force one flange toward the other flange to contract the tube and compress the material wound thereon.

In testimony whereof we affix our signatures in presence of two witnesses.

JOHN C. HEBDEN.
FREDERICK H. DANIELL.

Witnesses:
MARY A. O'KEEFFE,
ALEX. YOUNG DAVISON.